United States Patent Office 3,474,063
Patented Oct. 21, 1969

3,474,063
N,N'DIALIPHATIC THIODIPROPIONAMIDES AS SLIP AND ANTI-BLOCK ADDITIVES
Richard J. Powell, Orange, Tex., assignor to E. I. du Pont de Nemours and Company, Wilmington, Del., a corporation of Delaware
No Drawing. Continuation-in-part of application Ser. No. 512,232, Dec. 7, 1965. This application Oct. 13, 1967, Ser. No. 675,050
Int. Cl. C08f 29/04, 45/60
U.S. Cl. 260—30.8
10 Claims

ABSTRACT OF THE DISCLOSURE

N,N'dialiphatic thiodipropionamides in which each aliphatic group contains from 4 to 22 carbon atoms, e.g., N,N'dioctyl thiodipropionamide, is used as a slip agent in polymer in which the polymer chain is saturated and consists of carbon atoms, e.g., polyethylene.

---

This invention is a continuation-in-part of copending application Ser. No. 512,232, filed Dec. 7, 1965, now abandoned, by the same inventor.

This invention relates to films of carbon chain-saturated polymers, and more particularly, to additives for improving the slip and block properties of such films.

In many applications, e.g., the unrolling of a roll of plastic film or the feeding of sheets of film from a stack of such sheets, it is desirable that there be little cohesion of the film to an adjacent layer thereof. One measure of this cohesion is called block, which is a measure of the force required to peel one sheet of plastic film from another. Another measure of this cohesion is called slip, which is a measure of the force required to draw one sheet of plastic film across another sheet thereof. Generally, a low value for slip and for block means that a low force is required in each of these tests and therefore that the cohesion is also low. The use of agents in film resin compositions for the purpose of improving the slip and block properties of the resultant film is known. Such agents include oleamide, erucamide, and stearamide as used in polyethylene. There exists, however, a still further need for improved slip and anti-block agents for polyethylene and for other film-forming plastics.

It has been found that when certain N,N'dialiphatic thiodipropionamides are incorporated into a film-forming resin composition, the resultant film exhibits improved slip and block properties. The aliphatic substitutents of the thiodipropionamides are saturated or unsaturated radicals containing from 4 to 22 carbon atoms each. The preferred saturated groups are the straight-chained alkyls containing from 6 to 18 carbon atoms while the preferred unsaturated (alkenyl) groups are those which are straight-chained and monoethylenically unsaturated and which contain from 18 to 22 carbon atoms. Representative slip and anti-block additives of this invention include the thiodipropionamides in which the N,N'dialiphatic groups are dibutyl, dipentyl, dihexyl, dioctyl, dilauryl, distearyl, dioleyl, and dierucyl. Thiodipropionamides containing N,N'-dialiphatic groups having less than four carbon atoms are not effective slip and anti-block additives. N,N'dialiphatic substituted dipropionamides and their preparation are disclosed in British Patent No. 951,931 to Burgess and Griffiths, published Mar. 11, 1964.

The film-forming resins with which the additives of the present invention are useful fall generally within the class of polymers, including copolymers, in which the polymer chain or backbone consists entirely (except possibly for end groups) of saturated carbon atoms. Examples of such polymers include both linear and branched polyethylene, polypropylene, ethylene/propylene copolymer, copolymers of ethylene with other copolymerizable ethylenically unsaturated monomers such as vinyl acetate, alpha, beta monoethylenically unsaturated carboxylic acids and their esters and anhydrides, such as methyl methacrylate and acrylic, methacrylic, maleic; and fumaric acids and their monoalkyl esters and anhydrides, and ionomers which have from 0.25 to 12.5 equivalents of carboxylic acid groups substituted directly onto the polymer chain per 100 carbon atoms in the chain, with the pendent carboxylic acid groups being at least partially neutralized, viz., 10 to 100%, with metal ions generally having a valance of 1 to 3 inclusive, particularly those from Groups I($a$ and $b$) and II($a$ and $b$) and the transition elements of the Periodic Table, such as Mg, Zn, or Na, which ionically crosslink the polymer. The ionomers can be derived by copolymerization of ethylene with an alpha, beta monoethylenically unsaturated carboxylic acid and subsequent reaction with metal ions. The acid can be mono- or dicarboxylic or compounds which yield acid function in the copolymer chain and will generally have from 3 to 8 carbon atoms. Such acids and compounds include acrylic, methacrylic, maleic, and fumaric acids and the monoalkyl esters and anhydrides thereof. Ionomers are described in Canadian Patent No. 713,631 and U.S. Patent No. 3,264,-272 to Rees. A preferred ionomer is that which is formed by the copolymerization of ethylene and 2 to 8 mole percent of methacrylic acid to form an acid copolymer to which is added a neutralizing compound containing one of the above-mentioned metal ions.

Generally from 50 to 20,000 parts of additive per million parts of polymer, parts being by weight, will be useful. The exact amount of additive to be used will depend on the particular additive employed and the particular polymer with which it is used and the results desired therewith. Thus, optimum amounts can be determined by routine experimentation with particular additive/polymer compositions.

In the case of ionomers, from 1000 to 7000 p.p.m. of additive is preferred. In addition, from 500 to 5000 p.p.m. of finely divided silica can be used together with N,N'-dialiphatic thiodipropionamides to accelerate the effectiveness of the additive in highly glossy films, i.e., gloss greater than 80.

Other of the conventional compounding additives can be present, such as colorants, mold release agents, antioxidants, and other stabilizers.

The slip and anti-block agents of the present invention can be incorporated into the film-forming resin composition by conventional methods such as by injection of the agent into an extruder which is extruding the composition or by melt solution or dry blending with molding granules and then extrusion of the blend. Also a polymer concentrate of the agent(s) may be formed and then added to the main body of resin via an extruder. Other mixing equipment can be used such as the Banbury mixer or the roll mill.

The resultant resin composition can be subjected to any of the conventional film-forming processes such as the blowing, chill rolling, or the water bath to form film which is useful for wrapping, etc. and which exhibits improved slip and blocking properties generally, without sacrifice of the visual characteristics of the film, as measured by gloss and haze tests.

The following examples are illustrative of the present invention. Parts and percents are by weight unless otherwise indicated. In these examples, gloss is measured according to ASTM D-523-62T using a Gardner Gloss Meter and a 20° gloss head. Haze is measured according to ASTM D-1003-6-Procedure A using a Gardner Haze Meter. Slip is the kinetic coefficient of friction measured according to ASTM D-1894-63-Procedure B except that the sled measures 1.750″ in diameter and travels at 20″/min., and the slip measurement is an average of measurements taken with the following weights in pounds: 0.14, 0.34, 0.54, 0.74, and 1.14. Block is the force in pounds required to separate a film sandwich having a contact area of 8″² between two film samples. On blown film, the block is imparted by nip rolls. On chill roll film, the block is imparted by a 21.5 lb. weight for two minutes at 74° F. at 50 percent relative humidity.

EXAMPLES 1 TO 26

Various compositions are prepared in which N,N′dialiphatic thiodipropionamides are dry blended with ionomer consisting of a copolymer of ethylene and 10 percent by weight of methacrylic acid neutralized 50 to 55 percent with sodium ions and having a melt index of 1.2 and density of 0.940 g./cc. The resultant dry blend is then melt blended by extrusion at 210° C. in a 1½ inch Hartig extruder at 40 r.p.m. Films having a 1.25 mil thickness are formed by the conventional blown film process in a 2 inch Egan extruder or the chill roll flat film process. The silica is "Superfloss" silica and has an average particle size of 4 microns. Details of these compositions and test results are presented in Table I.

EXAMPLES 27–50

Various N,N′dialiphatic thiodipropionamide-ethylene vinylacetate copolymer compositions are prepared as in Examples 1–26, with the details and results of tests on blown films 1.25 mil thick presented in Table II. The extruder employed is a 2″ Egan operating at 190° C. and 1.8:1 blow-up, 40 ft./min. at approximately 40 r.p.m.

TABLE II

| Ex.[1] | Additive[2] | Additive Level, p.p.m. | Gloss | Percent Haze | Slip, lb./lb. | Block, lb. |
|---|---|---|---|---|---|---|
| 27 | None | 0 | 80 | 4.2 | 1.26 | 1.51 |
| 28 | do | 0 | 77 | 4.3 | 1.10 | 1.92 |
| 29 | Dibutyl | 1,000 | 83 | 4.1 | 0.20 | 0.27 |
| 30 | do | 1,000 | 85 | 4.1 | 0.16 | 0.67 |
| 31 | Dipentyl | 1,000 | 83 | 3.9 | 0.16 | 0.19 |
| 32 | do | 1,000 | 84 | 3.9 | 0.12 | 0.33 |
| 33 | Dihexyl | 1,000 | 82 | 3.9 | 0.07 | 0.11 |
| 34 | do | 1,000 | 81 | 4.0 | 0.08 | 0.12 |
| 35 | Dioctyl | 1,000 | 84 | 4.1 | 0.07 | 0.00 |
| 36 | do | 1,000 | 86 | 3.9 | 0.07 | 0.07 |
| 37 | Dilauryl | 1,000 | 86 | 3.8 | 0.20 | 0.43 |
| 38 | do | 1,000 | 84 | 3.9 | 0.24 | 0.27 |
| 39 | Dioleyl | 1,000 | 80 | 4.0 | 0.07 | 0.41 |
| 40 | do | 1,000 | 82 | 4.1 | 0.09 | 1.06 |
| 41 | Distearyl | 1,000 | 79 | 4.1 | 1.3 | 0.20 |
| 42 | do | 1,000 | 83 | 4.0 | 1.4 | 0.89 |
| 43 | None | 0 | 85 | 4.0 | [3] TS | 2.2 |
| 44 | do | 0 | | | 0.7 | 1.9 |
| 45 | Dioctyl | 250 | 76 | 4.4 | 0.10 | 1.2 |
| 46 | do | 250 | 81 | 4.9 | 0.08 | 0.99 |
| 47 | do | 500 | 83 | 5.0 | 0.05 | 0.02 |
| 48 | do | 500 | 84 | 4.9 | 0.08 | 0.80 |
| 49 | do | 750 | 85 | 5.0 | 0.07 | 0.48 |
| 50 | do | 750 | 79 | 5.0 | 0.09 | 0.11 |

[1] Ethylene/vinyl acetate copolymer of Examples 27–42 have a melt index of 2.5 and contain 3.8% by wt. vinyl acetate; of Examples 43–50, a melt index of 1.7 and 4.6% by wt. vinyl acetate.
[2] The N,N′dialiphatic groups of N,N′dialiphatic thiodipropionamide.
[3] TS=Too sticky.

EXAMPLES 51–74

Various compositions of N,N′dialiphatic thiodipropionamide with ethylene/propylene copolymer are prepared as in Examples 1–26. Table III lists the compositions and tests results on blown films 1.25 mil thick. The ethylene/propylene copolymer has a melt index of 1.7, density of 0.921 g./cc., and contains less than 3% by weight of propylene. The extruder employed in these examples is a 2″ Egan operating at 190° C. and 1.8:1 blow-up, 40 ft./min. at approximately 40 r.p.m.

TABLE I

| Example | Additive[1] | Additive Level, p.p.m. | Silica Level, p.p.m. | Method of Forming Film (Extrusion) | Melt, °C. used | Gloss | Percent Haze | Slip, lb./lb. | Block, lbs. |
|---|---|---|---|---|---|---|---|---|---|
| 1 | None | 0 | 0 | Blown Film | 190 | 73 | 2.5 | Too Sticky[2] | >3.74 |
| 2 | Dioctyl | 3,000 | 1,750 | do | 190 | 54 | 4.6 | 0.05 | 0.26 |
| 3 | do | 3,000 | 0 | do | 190 | 62 | 3.1 | 0.03 | 1.88 |
| 4 | None | 0 | 0 | do | 240 | 91 | 1.2 | Too Sticky | 3.81 |
| 5 | Dioctyl | 3,000 | 1,000 | do | 240 | 75 | 2.2 | 0.06 | 0.91 |
| 6 | Dilauryl | 3,000 | 2,000 | do | 240 | 75 | 2.5 | 0.25 | 1.29 |
| 7 | do | 5,000 | 2,000 | do | 240 | 83 | 1.9 | 0.18 | 1.47 |
| 8 | None | 0 | 0 | do | 240 | 96 | 0.9 | Too Sticky | 3.89 |
| 9 | Dioctyl | 3,000 | 2,000 | do | 240 | 75 | 2.3 | 0.13 | 0.77 |
| 10 | do | 3,000 | 2,000 | do | 230 | 55 | 3.4 | 0.14 | 0.43 |
| 11 | do | 3,000 | 2,000 | do | 220 | 53 | 3.9 | 0.09 | 0.65 |
| 12 | do | 3,000 | 2,000 | do | 210 | 40 | 5.1 | 0.06 | 0.38 |
| 13 | do | 3,000 | 2,000 | do | 200 | 28 | 7.3 | 0.12 | 0.0 |
| 14 | None | 0 | 0 | Chill Roll | 260 | 117 | 0.4 | | >3.85 |
| 15 | Dilauryl | 3,000 | 2,000 | do | 260 | 95 | 1.8 | | 2.08 |
| 16 | None | 0 | 0 | do | 260 | 118 | 0.3 | | >3.94 |
| 17 | Dioctyl | 2,000 | 1,500 | do | 260 | 106 | 1.1 | | 1.59 |
| 18 | None | 0 | 0 | do | 250 | 128 | 1.1 | Too Sticky | 3.73 |
| 19 | Dioctyl | 5,000 | 0 | do | 245 | 90 | 3.0 | 0.07 | 0.54 |
| 20 | do | 5,000 | 0 | do | 265 | 132 | 1.0 | Too Sticky | 3.42 |
| 21 | do | 5,000 | 2,500 | do | 260 | 104 | 2.9 | 0.09 | 0.94 |
| 22 | Dihexyl | 5,000 | 2,500 | do | 260 | 87 | 3.3 | 0.04 | 0.47 |
| 23 | do | 5,000 | 2,500 | do | 260 | 103 | 3.0 | 0.09 | 1.0 |
| 24 | None | 0 | 0 | do | 260 | 149 | 0.4 | Too Sticky | >3.7 |
| 25 | Dioctyl | 5,500 | 2,000 | do | 260 | 124 | 1.6 | 0.14 | 2.0 |
| 26 | do | 5,500 | 2,000 | do | 255 | 114 | 1.9 | 0.06 | 0.47 |

[1] The N,N′dialiphatic of groups of N,N′dialiphatic thiodipropionamide.
[2] Too sticky=>3.8.

TABLE III

| Ex. | Additive [1] | Additive Level, p.p.m. | Gloss | Percent Haze | Slip, lb./lb. | Block, lb. |
|---|---|---|---|---|---|---|
| 51 | | 0 | | | 1.1 | 0.97 |
| 52 | | 0 | 63 | | 0.98 | 1.7 |
| 53 | Dilauryl | 750 | 58 | | 0.40 | 0.45 |
| 54 | do | 750 | 74 | | 0.52 | 0.10 |
| 55 | Dioctyl | 750 | 55 | | 0.20 | 0.52 |
| 56 | do | 750 | 65 | | 0.18 | 0.04 |
| 57 | Dibutyl | 750 | 61 | | 0.94 | 1.4 |
| 58 | do | 750 | 60 | | 1.18 | 1.4 |
| 59 | Dihexyl | 1,000 | | | 0.21 | 0.49 |
| 60 | do | 1,000 | | | 0.33 | 0.55 |
| 61 | Dioctyl | 1,000 | | | 0.15 | 0.33 |
| 62 | do | 1,000 | | | 0.24 | 0.23 |
| 63 | | 0 | 33 | 6.9 | 0.98 | 1.51 |
| 64 | Dioleyl | 1,000 | 37 | 6.8 | 0.10 | 0.74 |
| 65 | do | 1,000 | 37 | 6.8 | 0.06 | 1.05 |
| 66 | | 0 | | | 0.81 | 1.33 |
| 67 | Dioleyl | 1,000 | | | 0.27 | 0.73 |
| 68 | do | 1,000 | | | 0.26 | 0.84 |
| 69 | | 0 | 19 | 10.7 | 1.05 | 0.36 |
| 70 | | 0 | 18 | 9.8 | 0.87 | 0.64 |
| 71 | Distearyl | 1,000 | 27 | 8.4 | 0.73 | 0.11 |
| 72 | do | 1,000 | 28 | 8.3 | 0.59 | 0.81 |
| 73 | {Distearyl / Dioleyl} | 500 / 500 | 28 / 28 | 8.2 / 8.2 | 0.30 / 0.30 | 0.125 / 0.125 |
| 74 | {Distearyl / Dioleyl} | 500 / 500 | 28 / 28 | 8.1 / 8.1 | 0.30 / 0.30 | 0.44 / 0.44 |

[1] The N,N'dialiphatic groups of N,N'dialiphatic thiodipropionamide.

As many apparently widely different embodiments of this invention may be made without departing from the spirit and scope thereof, it is to be understood that this invention is not limited to the specific embodiments thereof except as defined in the appended claims.

What is claimed is:

1. A resin composition consisting essentially of (a) polyethylene, polypropylene, ethylene/propylene copolymer, ethylene/vinyl acetate copolymer, a copolymer of ethylene with an alpha,beta monoethylenically unsaturated carboxylic acid, or a copolymer of ethylene with an alpha,beta monoethylenically unsaturated carboxylic acid having from 0.25 to 12.5 equivalents of carboxylic acid groups per 100 carbon atoms in the copolymer chain, said carboxylic acid groups being at least partially neutralized with and ionically crosslinked with ions of metals from Groups I(a and b) and II(a and b) or the transition elements of the Periodic Table and (b) as a slip agent, from 50 to 20,000 p.p.m. of N,N'dialiphatic thiodipropionamide in which each aliphatic group is alkyl or alkenyl and contains from 4 to 22 carbon atoms.

2. The resin composition of claim 1 wherein the acid of the last mentioned copolymer is methacrylic acid and the degree of neutralization is from 10 to 100%.

3. The resin composition of claim 1 wherein the aliphatic group is dilauryl.

4. The resin composition of claim 2 wherein each said aliphatic group is straight-chained, saturated, and contains from 4 to 18 carbon atoms or is monoethylenically unsaturated and contains from 4 to 18 carbon atoms.

5. The resin composition of claim 4 wherein the polymeric component of the composition is polyethylene.

6. The resin composition of claim 4 wherein the polymeric component of the composition is polypropylene.

7. The resin composition of claim 4 wherein the polymeric component of the composition is ethylene/propylene copolymer.

8. The resin composition of claim 4 wherein the polymeric component of the composition is ethylene/vinyl acetate copolymer.

9. The resin composition of claim 4 wherein the amount of methacrylic acid present is from 2 to 8 mole percent.

10. The resin composition of claim 9 wherein said metal ions are Mg, Zn, or Na.

No references cited.

MORRIS LIEBMAN, Primary Examiner

P. R. MICHL, Assistant Examiner

U.S. Cl. X.R.

260—32.6